(12) United States Patent
O'Brien et al.

(10) Patent No.: US 9,212,301 B2
(45) Date of Patent: Dec. 15, 2015

(54) COMPOSITION FOR PREPARING POLYSACCHARIDE FIBERS

(75) Inventors: John P. O'Brien, Oxford, PA (US); Kathleen Opper, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 863 days.

(21) Appl. No.: 13/333,263

(22) Filed: Dec. 21, 2011

(65) Prior Publication Data

US 2013/0161562 A1 Jun. 27, 2013

(51) Int. Cl.
| | |
|---|---|
| *B29B 9/06* | (2006.01) |
| *C08B 37/00* | (2006.01) |
| *C09K 3/00* | (2006.01) |
| *C08L 5/00* | (2006.01) |
| *D01F 1/02* | (2006.01) |
| *D01F 9/00* | (2006.01) |

(52) U.S. Cl.
CPC ... *C09K 3/00* (2013.01); *C08L 5/00* (2013.01); *D01F 1/02* (2013.01); *D01F 9/00* (2013.01)

(58) Field of Classification Search
CPC ............. C09K 3/00; C08L 5/00; D01F 1/02; D01F 9/00
See application file for complete search history.

(56) References Cited

U.S. PATENT DOCUMENTS

| | | | |
|---|---|---|---|
| 4,501,886 A | 2/1985 | O'Brien | |
| 7,000,000 B1 | 2/2006 | O'Brien | |
| 2013/0087938 A1* | 4/2013 | O'Brien et al. | 264/8 |

OTHER PUBLICATIONS

Ogawa et al., Fiber Diffraction Methods, 47, pp. 353-362 (1980).

* cited by examiner

*Primary Examiner* — Robert Harlan

(57) ABSTRACT

This invention pertains to a novel solution composition useful for preparing fibers from poly($\alpha(1\rightarrow3)$ glucan). The fibers prepared according to the invention, have "cotton-like" properties, are useful in textile applications, and can be produced as continuous filaments on a year-round basis. The solution comprises a 5-20% solids concentration of poly($\alpha(1\rightarrow3)$ glucan) in an aqueous alkali metal hydroxide, in particular NaOH at concentration of 2 to 10 weight-%.

8 Claims, 1 Drawing Sheet

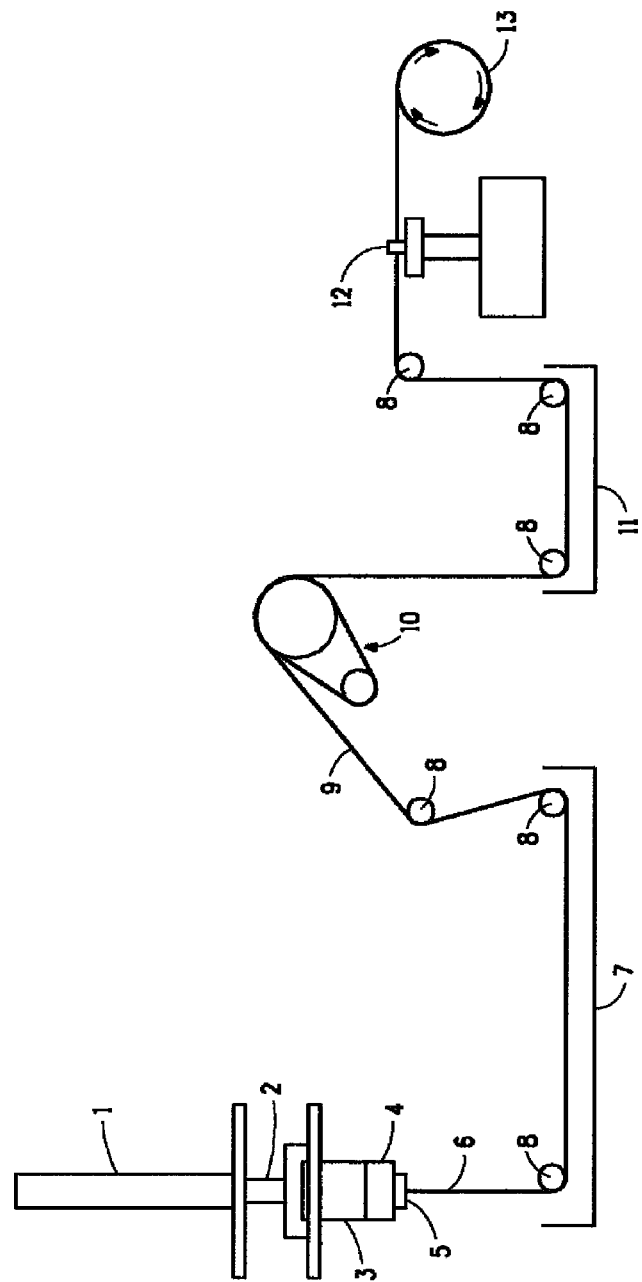

COMPOSITION FOR PREPARING POLYSACCHARIDE FIBERS

FIELD OF THE INVENTION

The present invention is directed to a process for solution spinning poly(α(1→3) glucan) from a solution thereof in an aqueous alkali metal hydroxide and to the solution itself. The poly(α(1→3) glucan) employed was synthesized by fermentation.

BACKGROUND OF THE INVENTION

Polysaccharides have been known since the dawn of civilization, primarily in the form of cellulose, a polymer formed from glucose by natural processes via β(1→4) glycoside linkages; see, for example, *Applied Fibre Science*, F. Happey, Ed., Chapter 8, E. Atkins, Academic Press, New York, 1979. Numerous other polysaccharide polymers are also disclosed therein.

Only cellulose among the many known polysaccharides has achieved commercial prominence as a fiber. In particular, cotton, a highly pure form of naturally occurring cellulose, is well-known for its beneficial attributes in textile applications.

It is further known that cellulose exhibits sufficient chain extension and backbone rigidity in solution to form liquid crystalline solutions; see, for example O'Brien, U.S. Pat. No. 4,501,886. The teachings of the art suggest that sufficient polysaccharide chain extension could be achieved only in β(1→4) linked polysaccharides and that any significant deviation from that backbone geometry would lower the molecular aspect ratio below that required for the formation of an ordered phase.

More recently, glucan polymer, characterized by α(1→3) glycoside linkages, has been isolated by contacting an aqueous solution of sucrose with GtfJ glucosyltransferase isolated from *Streptococcus salivarius*, Simpson et al., Microbiology, vol 141, pp. 1451-1460 (1995). Highly crystalline, highly oriented, low molecular weight films of α(1→3)-D-glucan have been fabricated for the purposes of x-ray diffraction analysis, Ogawa et al., Fiber Diffraction Methods, 47, pp. 353-362 (1980). In Ogawa, the insoluble glucan polymer is acetylated, the acetylated glucan dissolved to form a 5% solution in chloroform and the solution cast into a film. The film is then subjected to stretching in glycerine at 150° C. which orients the film and stretches it to a length 6.5 times the original length of the solution cast film. After stretching, the film is deacetylated and crystallized by annealing in superheated water at 140° C. in a pressure vessel. It is well-known in the art that exposure of polysaccharides to such a hot aqueous environment results in chain cleavage and loss of molecular weight, with concomitant degradation of mechanical properties.

Polysaccharides based on glucose and glucose itself are particularly important because of their prominent role in photosynthesis and metabolic processes. Cellulose and starch, both based on molecular chains of polyanhydroglucose are the most abundant polymers on earth and are of great commercial importance. Such polymers offer materials that are environmentally benign throughout their entire life cycle and are constructed from renewable energy and raw materials sources.

The term "glucan" is a term of art that refers to a polysaccharide comprising beta-D-glucose monomer units that are linked in eight possible ways, Cellulose is a glucan.

Within a glucan polymer, the repeating monomeric units can be linked in a variety of configurations following an enchainment pattern. The nature of the enchainment pattern depends, in part, on how the ring closes when an aldohexose ring closes to form a hemiacetal. The open chain form of glucose (an aldohexose) has four asymmetric centers (see below). Hence there are $2^4$ or 16 possible open chain forms of which D and L glucose are two. When the ring is closed, a new asymmetric center is created at C1 thus making 5 asymmetric carbons. Depending on how the ring closes, for glucose, α(1→4)-linked polymer, e.g. starch, or β(1→4)-linked polymer, e.g. cellulose, can be formed upon further condensation to polymer. The configuration at C1 in the polymer determines whether it is an alpha or beta linked polymer, and the numbers in parenthesis following alpha or beta refer to the carbon atoms through which enchainment takes place.

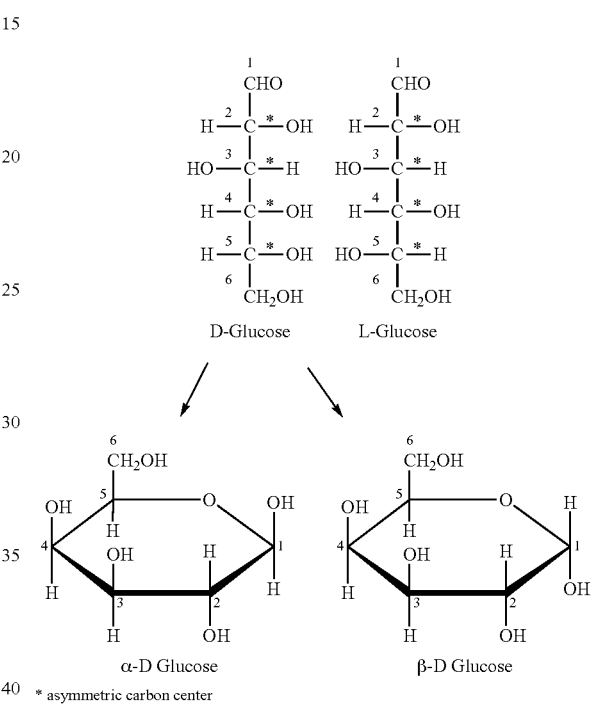

\* asymmetric carbon center

The properties exhibited by a glucan polymer are determined by the enchainment pattern. For example, the very different properties of cellulose and starch are determined by the respective nature of their enchainment patterns. Starch or amylose consists of α(1→4) linked glucose and does not form fibers among other things because it is swollen or dissolved by water. On the other hand, cellulose consists of β(1→4) linked glucose, and makes an excellent structural material being both crystalline and hydrophobic, and is commonly used for textile applications as cotton fiber, as well as for structures in the form of wood.

Like other natural fibers, cotton has evolved under constraints wherein the polysaccharide structure and physical properties have not been optimized for textile uses. In particular, cotton fiber is of short fiber length, limited variation in cross section and fiber fineness and is produced in a highly labor and land intensive process.

O'Brien, U.S. Pat. No. 7,000,000 discloses a process for preparing fiber from liquid crystalline solutions of acetylated poly(α(1→3) glucan). Thus prepared fiber was then de-acetylated resulting in a fiber of poly(α(1→3) glucan).

SUMMARY OF THE INVENTION

Considerable benefit accrues to the process hereof that provides a highly oriented and crystalline poly(α(1→3) glucan) fiber without sacrifice of molecular weight by the solution spinning of fiber from the novel solution hereof.

In one aspect the present invention is directed to a solution comprising aqueous alkali metal hydroxide and poly(α(1→3) glucan) wherein the solids concentration of poly(α(1→3) glucan) is in the range of 5 to 20% by weight with respect to the total weight of the solution; and, wherein the concentration of the aqueous alkali metal hydroxide is in the range of 2 to 10%.

In one embodiment, the solution is isotropic.

In another aspect, the present invention is directed to a process for preparing a poly(alpha(1→3) glucan) fiber, comprising forming a solution by dissolving in an aqueous alkali metal hydroxide, 5 to 20% by weight of the total weight of the resulting solution of poly(alpha(1→3) glucan) characterized by a number average molecular weight ($M_n$) of at least 10,000 Da, wherein the concentration of the alkali metal hydroxide is 2 to 10%; causing said solution to flow through a spinneret, forming a fiber thereby; and causing the aqueous alkali metal hydroxide to be extracted from the thus formed fiber by contacting said fiber with an acidic liquid coagulant.

BRIEF DESCRIPTION OF THE DRAWING

FIG. 1 is a schematic diagram of an apparatus suitable for air gap or wet spinning of the aqueous alkali metal hydroxide solutions of PAG hereof.

DETAILED DESCRIPTION

When a range of values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 encompasses a range from 35.0 to 44.9, whereas the number 40.0 encompasses a range from 39.50 to 40.49.

The term "solids content" is a term of art. It is used herein to refer to the percentage by weight of poly(alpha(1→3) glucan) (PAG) in the aqueous alkali metal hydroxide solution hereof. It is calculated from the formula $$SC = \frac{Wt(PAG)}{Wt(PAG) + Wt(MOH(aq))}$$

where SC represents "solids content," and Wt(PAG), Wt(MOH(aq)) are respectively weights of the poly(α(1→3) glucan), and the aqueous alkali metal hydroxide. The term "solids content" is synonymous with the concentration by weight of poly(α(1→3) glucan) with respect to the total weight of solution.

Percent by weight is represented by the term "wt-%."

The formula "MOH" shall be employed to refer to the alkali metal hydroxide suitable for the practice of the invention. The formula "MOH(aq)" shall be employed to refer to the aqueous alkali metal hydroxide solution suitable for the practice of the invention. It shall be understood that the expression "concentration of the MOH(aq)" shall refer to the concentration—by weight—of the alkali metal hydroxide in the aqueous solution thereof.

While the term "glucan" refers to a polymer, it also encompasses oligomers and low molecular weight polymers that are unsuitable for fiber formation. For the purposes of the present invention, the polymer suitable for the practice thereof shall be referred to as "poly(α(1→3) glucan)" or in abbreviated form as PAG.

A polymer, including glucan, and poly(α(1→3) glucan) in particular, is made up of a plurality of so-called repeat units covalently linked to one another. The repeat units in a polymer chain are diradicals, the radical form providing the chemical bonding between repeat units. For the purposes of the present invention the term "glucose repeat units" shall refer to the diradical form of glucose that is linked to other diradicals in the polymer chain, thereby forming said polymer chain.

In one aspect the present invention is directed to a solution comprising aqueous alkali metal hydroxide and poly(α(1→3) glucan) wherein the solids concentration of poly(α(1→3) glucan) is in the range of 5-20% by weight with respect to the total weight of the solution; and, wherein the concentration of the aqueous alkali metal hydroxide is in the range of 2 to 10%.

In one embodiment, the solution is isotropic.

In one embodiment, the alkali metal hydroxide (MOH) is sodium hydroxide. In a further embodiment the concentration of the NaOH is in the range of 4 to 6%.

In one embodiment, the solids concentration is in the range of 7.5 to 16%.

For the purposes of the present invention, the term "isotropic solution" refers to a solution exhibiting a disordered morphology. Isotropic solutions stand in contrast with the morphology of liquid crystalline solutions that exhibit ordered regions as described in U.S. Pat. No. 7,000,000. It has surprisingly been found that the embodiment of the solution hereof that is isotropic is useful for the preparation of fibers using common solution spinning methods such as are known in the art.

The (PAG) suitable for use in the present invention is a glucan characterized by a number average molecular weight ($M_n$) of at least 10,000 Da wherein at least 90 mol-% of the repeat units in the polymer are glucose repeat units and at least 50% of the linkages between glucose repeat units are α(1→3) glycoside linkages. Preferably at least 95 mol-%, most preferably 100 mol-%, of the repeat units are glucose repeat units. Preferably at least 90%, most preferably 100%, of the linkages between glucose units are α(1→3) glycoside linkages.

The isolation and purification of various polysaccharides is described in, for example, *The Polysaccharides*, G. O. Aspinall, Vol. 1, Chap. 2, Academic Press, New York, 1983. Any means for producing the α(1→3) polysaccharide suitable for the invention in satisfactory yield and 90% purity is suitable. In one such method, disclosed in U.S. Pat. No. 7,000,000, poly(α(1→3)-D-glucose) is formed by contacting an aqueous solution of sucrose with gtfJ glucosyltransferase isolated from *Streptococcus salivarius* according to the methods taught in the art. In an alternative such method, the gtfJ is generated by genetically modified *E. Coli*, as described in detail, infra.

The PAG suitable for use in the present invention can further comprise repeat units linked by a glycoside linkage other than α(1→3), including α(1→4), α(1→6), β(1→3), β(1→4) or β(1→6) or any combination thereof. According to the present invention, at least 50% of the glycoside linkages in the polymer are α(1→3) glycoside linkages. Preferably at least 90%, most preferably 100%, of the linkages between glucose units are α(1→3) glycoside linkages.

The solution hereof is prepared by adding a suitable PAG to MOH(aq), agitating to obtain thorough mixing. The solids content of PAG in the solution ranges from 5 to 20% by weight with respect to the total weight of the solution. When solids content of PAG is below 5%, the fiber-forming capability of the solution is greatly degraded. Solutions with solids content above 16% are increasingly problematical to form, requiring increasingly refined solution forming techniques.

In any given embodiment, the solubility limit of PAG is a function of the molecular weight of the PAG, the concentration of the MOH(aq), the duration of mixing, the viscosity of the solution as it is being formed, the shear forces to which the solution is subject, and the temperature at which mixing takes place. In general, lower molecular weight PAG will be more soluble than higher molecular weight, other things being equal. Generally, higher shear mixing, longer mixing time, and higher temperature will be associated with higher solubility. The maximum temperature for mixing is limited by the boiling point of the MOH(aq). The optimum concentration of the MOH(aq) may change depending upon the other parameters in the mixing process.

In another aspect, the present invention is directed to a process for preparing a poly(alpha(1→3) glucan) fiber, comprising forming a solution by dissolving in an aqueous alkali metal hydroxide, 5 to 20% by weight of the total weight of the resulting solution of poly(alpha(1→3) glucan) characterized by a number average molecular weight ($M_n$) of at least 10,000 Da, wherein the concentration of the alkali metal hydroxide is 2 to 10%; causing said solution to flow through a spinneret, forming a fiber thereby; and causing the aqueous alkali metal hydroxide to be extracted from the thus formed fiber by contacting said fiber with a liquid coagulant.

In one embodiment, the solution is isotropic.

In one embodiment, the alkali metal (M) is sodium.

In a further embodiment, the isotropic solution further comprises a poly(α(1→3) glucan) wherein 100% of the repeat units therein are glucose, and 100% of the linkages between glucose repeat units are α(1→3) glycoside linkages.

The minimum solids content of PAG required in the solution in order to achieve stable fiber formation varies according to the specific molecular morphology and the molecular weight of the PAG, as well as the concentration of the MOH (aq). It is found in the practice of the invention that a 5% solids content is an approximate lower limit to the concentration needed for stable fiber formation. A solution having a solids content of at least 10% is preferred. A solids content ranging from about 10% to about 15% is more preferred. Preferred is a poly(alpha(1→3) glucan) characterized by a number average molecular weight of ca. 60,000 Daltons. Optimum spinning performance for this particular polymer is achieved at about 10 to about 12% solids content in a NaOH(aq) solution having a concentration of 4 to 6%.

Spinning from the solution hereof can be accomplished by means known in the art, and as described in O'Brien, op. cit. The viscous spinning solution can be forced by means such as the push of a piston or the action of a pump through a single or multi-holed spinneret or other form of die. The spinneret holes can be of any cross-sectional shape, including round, flat, multi-lobal, and the like, as are known in the art. The extruded strand can then be passed by ordinary means into a coagulation bath wherein is contained a liquid coagulant which extracts the MOH(aq) but not the polymer, thus causing the highly oriented polymer to coagulate into a fiber according to the present invention.

Suitable liquid coagulants include but are not limited to glacial acetic acid, sulfuric acid, combinations of sulfuric acid, sodium sulfate, and zinc sulfate. In one embodiment, the liquid coagulant is maintained at a temperature in the range of 20-100° C.

In one embodiment, the coagulation bath comprises glacial acetic acid. It is found in the practice of the invention that satisfactory results are achieved by employing as the coagulant liquid an excess of glacial acetic acid. During the course of spinning, the glacial acetic acid absorbs aqueous NaOH as the as-spun fiber passes through the coagulant bath.

Under some circumstances, a superior result is achieved when the extruded strand first passes through an inert, non-coagulating layer, usually an air gap, prior to introduction into the coagulation bath. When the inert layer is an air gap, the spinning process is known as air-gap spinning. Under other circumstances, there is no inert, noncoagulating layer, and extrusion is effected directly into the coagulation bath. In such a circumstance, known in the art as "wet-spinning," the spinneret is partially or fully immersed in the coagulation bath. Wet spinning is preferred.

In one embodiment, the process further comprises soaking the coagulated fiber in a neutral to basic liquid, including but not limited to $H_2O$, methanol, or 5% aqueous $NaHCO_3$. Aqueous $NaHCO_3$ is preferred.

EXAMPLES

Preparation of Glucosyltransferase (GtfJ) Enzyme

Materials

Dialysis tubing (Spectrapor 25225-226, 12000 molecular weight cut-off) was obtained from VWR (Radnor, Pa.).

Dextran and ethanol were obtained from Sigma Aldrich.

Sucrose was obtained from VWR.

Suppressor 7153 antifoam was obtained from Cognis Corporation (Cincinnati, Ohio).

All other chemicals were obtained from commonly used suppliers.

Seed Medium

The seed medium, used to grow the starter cultures for the fermenters, contained: yeast extract (Amberx 695, 5.0 grams per liter (g/L)), $K_2HPO_4$ (10.0 g/L), $KH_2PO_4$ (7.0 g/L), sodium citrate dihydrate (1.0 g/L), $(NH_4)_2SO_4$ (4.0 g/L), $MgSO_4$ heptahydrate (1.0 g/L) and ferric ammonium citrate (0.10 g/L). The pH of the medium was adjusted to 6.8 using either 5N NaOH or $H_2SO_4$ and the medium was sterilized in the flask. Post sterilization additions included glucose (20 mL/L of a 50% w/w solution) and ampicillin (4 mL/L of a 25 mg/mL stock solution).

Fermenter Medium

The growth medium used in the fermenter contained: $KH_2PO_4$ (3.50 g/L), $FeSO_4$ heptahydrate (0.05 g/L), $MgSO_4$ heptahydrate (2.0 g/L), sodium citrate dihydrate (1.90 g/L), yeast extract (Amberx 695, 5.0 g/L), Suppressor 7153 antifoam (0.25 milliliters per liter, mL/L), NaCl (1.0 g/L), $CaCl_2$ dihydrate (10 g/L), and NIT trace elements solution (10 mL/L). The NIT trace elements solution contained citric acid monohydrate (10 g/L), $MnSO_4$ hydrate (2 g/L), NaCl (2 g/L), $FeSO_4$ heptahydrate (0.5 g/L), $ZnSO_4$ heptahydrate (0.2 g/L), $CuSO_4$ pentahydrate (0.02 g/L) and $NaMoO_4$ dihydrate (0.02 g/L). Post sterilization additions included glucose (12.5 g/L of a 50% w/w solution) and ampicillin (4 mL/L of a 25 mg/mL stock solution).

Construction of Glucosyltransferase (gtfJ) Enzyme Expression Strain

A gene encoding the mature glucosyltransferase enzyme (gtfJ; EC 2.4.1.5; GENBANK® AAA26896.1, SEQ ID NO: 3) from *Streptococcus salivarius* (ATCC 25975) was synthesized using codons optimized for expression in *E. coli* (DNA 2.0, Menlo Park Calif.). The nucleic acid product (SEQ ID NO: 1) was subcloned into pJexpress404® (DNA 2.0, Menlo Park Calif.) to generate the plasmid identified as pMP52 (SEQ ID NO: 2). The plasmid pMP52 was used to transform *E. coli* MG1655 (ATCC 47076™) to generate the strain identified as MG1655/pMP52.

Standard recombinant DNA and molecular cloning techniques used herein are well known in the art and are described by Sambrook, J. and Russell, D., *Molecular Cloning: A Laboratory Manual*, Third Edition, Cold Spring Harbor Laboratory Press, Cold Spring Harbor, N.Y. (2001); and by Silhavy, T. J., Bennan, M. L. and Enquist, L. W., *Experiments with Gene Fusions*, Cold Spring Harbor Laboratory Press, Cold Spring Harbor, N.Y. (1984); and by Ausubel, F. M. et. al., *Short Protocols in Molecular Biology*, 5$^{th}$ Ed. Current Protocols, John Wiley and Sons, Inc., N.Y., 2002.

Materials and methods suitable for the maintenance and growth of microbial cultures are well known in the art. Techniques suitable for use in the following examples may be found as set out in *Manual of Methods for General Bacteriology* (Phillipp Gerhardt, R. G. E. Murray, Ralph N. Costilow, Eugene W. Nester, Willis A. Wood, Noel R. Krieg and G. Briggs Phillips, Eds.), American Society for Microbiology: Washington, D.C. (1994)); or in *Manual of Industrial Microbiology and Biotechnology*, 3$^{rd}$ Edition (Richard H. Baltz, Julian E. Davies, and Arnold L. Demain Eds.), ASM Press, Washington, D.C., 2010.

Production of Recombinant gtfJ in Fermentation

Production of the recombinant gtfJ enzyme in a fermenter was initiated by expressing the gtfJ enzyme, constructed as described supra. A 10 mL aliquot of the seed medium was added into a 125 mL disposable baffled flask and was inoculated with a 1.0 mL culture of the *E. coli* MG1655/pMP52 prepared supra, in 20% glycerol. This culture was allowed to grow at 37° C. while shaking at 300 revolutions per minute (rpm) for 3 hours.

A seed culture, for starting the fermenter, was prepared by charging a 2 L shake flask with 0.5 L of the seed medium. 1.0 mL of the pre-seed culture was aseptically transferred into 0.5 L seed medium in the flask and cultivated at 37° C. and 300 rpm for 5 hours. The seed culture was transferred at optical density 550 nm ($OD_{550}$)>2 to a 14 L fermenter (Braun, Perth Amboy, N.J.) containing 8 L of the fermenter medium described above at 37° C.

Cells of *E. coli* MG1655/pMP52 were allowed to grow in the fermenter and glucose feed (50% w/w glucose solution containing 1% w/w $MgSO_4 \cdot 7H_2O$) was initiated when glucose concentration in the medium decreased to 0.5 g/L. The feed was started at 0.36 grams feed per minute (g feed/min) and increased progressively each hour to 0.42, 0.49, 0.57, 0.66, 0.77, 0.90, 1.04, 1.21, 1.41 1.63, 1.92, 2.2 g feed/min respectively. The rate was held constant afterwards by decreasing or temporarily stopping the glucose feed when glucose concentration exceeded 0.1 g/L. Glucose concentration in the medium was monitored using a YSI glucose analyzer (YSI, Yellow Springs, Ohio).

Induction of glucosyltransferase enzyme activity was initiated, when cells reached an $OD_{550}$ of 70, with the addition of 9 mL of 0.5 M IPTG (isopropyl β-D-1-thiogalacto-pyranoside). The dissolved oxygen (DO) concentration was controlled at 25% of air saturation. The DO was controlled first by impeller agitation rate (400 to 1200 rpm) and later by aeration rate (2 to 10 standard liters per minute, slpm). The pH was controlled at 6.8. $NH_4OH$ (14.5% weight/volume, w/v) and $H_2SO_4$ (20% w/v) were used for pH control. The back pressure was maintained at 0.5 bars. At various intervals (20, 25 and 30 hours), 5 mL of Suppressor 7153 antifoam was added into the fermenter to suppress foaming. Cells were harvested by centrifugation 8 hours post IPTG addition and were stored at −80° C. as a cell paste.

Preparation of gtfJ Crude Enzyme Extract from Cell Paste

The cell paste obtained above was suspended at 150 g/L in 50 mM potassium phosphate buffer pH 7.2 to prepare a slurry. The slurry was homogenized at 12,000 psi (Rannie-type machine, APV-1000 or APV 16.56) and the homogenate chilled to 4° C. With moderately vigorous stirring, 50 g of a floc solution (Aldrich no. 409138, 5% in 50 mM sodium phosphate buffer pH 7.0) was added per liter of cell homogenate. Agitation was reduced to light stirring for 15 minutes. The cell homogenate was then clarified by centrifugation at 4500 rpm for 3 hours at 5-10° C. Supernatant, containing crude gtfJ enzyme extract, was concentrated (approximately 5×) with a 30 kilo Dalton (kDa) cut-off membrane. The concentration of protein in the gtfJ enzyme solution was determined by the bicinchoninic acid (BCA) protein assay (Sigma Aldrich) to be 4-8 g/L.

Preparation of Polymer, Spinning Solutions, and Fiber

Spinning Apparatus and Procedure

FIG. 1 is a schematic diagram of an apparatus suitable for use in the fiber spinning process hereof. The worm gear drive, 1, drives a ram, 2, at a controlled rate onto a piston fitted into a spinning cell, 3. The spinning cell may contain filter assemblies. A suitable filter assembly includes 100 and 325 mesh stainless steel screens. A spin pack, 5, contains the spinneret and optionally stainless steel screens as prefilters for the spinneret. The extruded filament, 6, produced therefrom is optionally directed through an inert non coagulating layer (typically an air gap) and into a liquid coagulation bath, 7. In ALL the examples listed in Table 2, there was no air gap. The filament was extruded from the spinneret into the liquid coagulation bath—the bottom of the spinneret was immersed in the bath.

The extrudate can be, but need not be, directed back and forth through the bath between guides, 8, which are normally fabricated of Teflon® PTFE. Only one pass through the bath is shown in FIG. 1. On exiting the coagulation bath, 7, the thus quenched filament, 9, can optionally be directed through a drawing zone using an independently driven roll, 10, around which the thus quenched filament is wrapped. The quenched filament may optionally be directed through a draw bath, 11, that allows further treatment such as additional solvent extraction, washing or drawing of the extruded filaments. The thus prepared filament is then directed through a traversing mechanism to evenly distribute the fiber on the bobbin, 12, and collected on plastic bobbins using a wind up, 13. In one embodiment, the process comprises a plurality of independently driven rolls.

In one embodiment, the driven roll, 10, is removed from the fiber pathway, but the fiber is nevertheless immersed in the draw bath. The two are independent of each other. In most of the examples, infra, the driven roll, 10, was removed from the fiber pathway.

In one embodiment, a plurality of filaments is extruded through a multi-hole spinneret, and the filaments so produced are converged to form a yarn. In a further embodiment, the process further comprises a plurality of multi-hole spinnerets so that a plurality of yarns can be prepared simultaneously.

The number of holes in the spinneret, and the dimensions of the holes are shown for each example in Table 2. Those entries in Table 2 under "# Holes" shown as, e.g., "4/5," are meant to indicate that there were 5 holes in the spinneret, but one of them was intermittently plugged, so that the filament produced from that one hole was not continuous.

In each example, the wound bobbin of fiber produced was soaked overnight in a bucket of the liquid indicated in Table 2.

The thus soaked bobbin of fiber was then air dried for at least 24 hours. The fiber tensile properties were then determined according to ASTM D2101-82.

The spin cell, the piston, the tubing and the spinneret were all constructed of stainless steel.

Fiber Physical Property Measurement

Physical properties such as tenacity, elongation and initial modulus were measured using methods and instruments conforming to ASTM Standard D 2101-82, except that the test specimen length was 10 inches. Reported results are averages for 3 to 5 individual yarn tests.

The physical properties were determined for every fiber prepared. The results are shown in Table 2. Included are the denier of the fiber produced, and the physical properties such as tenacity (T) in grams per denier (gpd), elongation to break (E, %), and initial modulus (M) in gpd.

Materials

| Sucrose | BDH8029 | VWR |
|---|---|---|
| Glucose | G7528 | Sigma-Aldrich |
| Dextran T-10 | D9260 | Sigma-Aldrich |
| Undenatured Ethanol | 459844 | Sigma-Aldrich |
| LA Biocide | | Thor |
| BN Biocide | | Arch |

GLOSSARY OF TERMS

| Column Label | Actual Term | Explanation |
|---|---|---|
| Jet Vel. (fpm) | Jet Velocity | The linear speed of the fiber at the exit from the spinneret. |
| fpm | Feet per minute | |
| Coag. Temp. | Coagulation Temperature | |
| NA | Not Applicable | The parameter does not apply to this example. |
| NT | Not Tested | |
| S.S.F. | Spin Stretch Factor | S.S.F. = (wind-up speed)/(jet vel.) |
| MeOH | Methanol | |

Examples 1-9

Preparation of Polymer P1 (E117134-81-2)

E117134-8-1 Method

Twenty liters of an aqueous solution was prepared by combining 3000 g of sucrose (VWR #BDH8029), Dextran T-10 60 g (Sigma #D9260), undenatured ethanol (Sigma Aldrich #459844) and one liter of potassium phosphate buffer adjusted to pH 6.8-7.0. All of the ingredients were added in the amount listed in Table 1, the pH was adjusted and the volume brought up to 20 liters. The solution was then charged with 200 mL of the enzyme extract prepared supra and allowed to stand at ambient temperature for 144 hours. The resulting glucan solids were collected on a Buchner funnel using a 325 mesh screen over 40 micrometer filter paper. The filter cake was suspended in deionized water and filtered twice more as above. Finally two additional washes with methanol were carried out, the filter cake was pressed out on the funnel and dried in vacuum at room temperature. Yield: 403 grams of white flaky solids.

Molecular weights were determined by size exclusion chromatography (SEC) with a GPCV/LS 2000™ (Waters Corporation, Milford, Mass.) chromatograph equipped with two Zorbax PSM Bimodal-s silica columns (Agilent, Wilmington, Del.), using DMAc from J. T Baker, Phillipsburg, N.J. with 3.0% LiCl (Aldrich, Milwaukee, Wis.) as the mobile phase. Samples were dissolved in DMAc with 5.0% LiCl. Number and weight average molecular weights were found to be 64,863 and 168,120 Daltons respectively.

25-30 mg of the polymer were dissolved in 1 mL of deuterated DMSO. The $^{13}C$ NMR spectrum (Bruker Avance 500 MHz NMR spectrometer equipped with a CPDul cryoprobe) showed the presence of resonance peaks consistent with the six expected discrete carbon atoms for poly($\alpha(1\rightarrow3)$ glucan) at 99.46, 81.66, 72.13, 71.09, 69.66, and 60.30 ppm as well as resonance peaks at 98.15, 73.57, 71.63, 70.17, 65.79 and 60.56, ppm due to the six distinct carbon atoms of the dextran primer.

TABLE 1

| Material | P1 | P2 | P3 | P4 | P5 | P6 | P7 |
|---|---|---|---|---|---|---|---|
| Sucrose | 3000 g | 450 g | 150 g | 450 g | 450 g | 450 g | 450 g |
| Dextran T-10 | 60 g | 6 g | 3 g | 1.2 g | 6 g | 2.4 g | 3 g |
| Glucose | NA | NA | NA | NA | NA | NA | NA |
| KH2PO4 (1M) | 1 L | 50 mL | 50 mL | 50 mL | 50 mL | 50 mL | 50 mL |
| 10% KOH | to pH 7 | to pH 7 | to pH 7.5 | to pH 7 | to pH 7 | to pH 7 | to pH 7 |
| 4M NaOH | to pH 7 | to pH 7 | to pH 7.5 | to pH 7 | to pH 7 | to pH 7 | to pH 7 |
| Enzyme Extract | 200 mL | 20.1 mL | 17 mL | 20.1 mL | 20.1 mL | 20.1 mL | 20.1 mL |
| Boric Acid | NA | NA | 300 mM | NA | NA | NA | NA |
| LA Biocide | NA | NA | NA | NA | 3 g | NA | NA |
| BN Biocide | NA | 3 g | NA | NA | NA | NA | NA |
| Ethanol | 2 Liters | NA | NA | 150 mL | NA | 150 mL | 150 mL |
| De-ionized water | to 20 Liters | to 3 Liters | to 3 Liters | to 3 Liters | to 3 Liters | to 3 Liters | to 3 Liters |
| Yield (g) | 403 | 42.9 | 36.5 | 37.3 | 44.1 | 4 | 32.1 |

| Material | P8 | P9 | P10 | P11 | P12 |
|---|---|---|---|---|---|
| Sucrose | 28.5 kg | 150 g | 150 g | 1000 g | 3000 g |
| Dextran T-10 | 569 g | NA | NA | NA | 20 g |
| Glucose | NA | 2.4 g | (2.4 g) | 20 g | NA |
| KH2PO4 (1M) | 9.5 Liter | 22.5 mL | 22.5 ml | 136.09 g | 136.09 |
| 10% KOH | to pH 7 | to pH 7 | to pH 7 | to pH 7.5 | to pH 7 |
| 4M NaOH | to pH 7 | to pH 7 | to pH 7 | to pH 7.5 | to pH 7 |
| Enzyme Extract | 1.9 L | 35 units/L | 35 units/L | 50 U/L | 200 mL |
| Boric Acid | NA | NA | NA | 300 mM | NA |
| LA Biocide | NA | NA | NA | NA | NA |

TABLE 1-continued

| | | | | | |
|---|---|---|---|---|---|
| BN Biocide | NA | NA | NA | NA | NA |
| Ethanol | 19 L | NA | NA | NA | NA |
| De-ionized water | to 190 L | to 3 liters | to 20 liters | to 20 L | to 20 L |
| Yield (g) | 3864 | 28.2 | 27.7 | 241.8 | 384.56 |

Spinning Solution S1 (117134-81-2)

A 100 mL wide mouth glass bottle was charged with 8 g of polymer P1 and 45 g of 5 wt % sodium hydroxide. The container was fitted with a cap through which a polypropylene stirring rod had been fitted through a septum. The contents were manually mixed with the stirring rod and then placed in a refrigerator at 5° C. overnight. The following day the partially dissolved solution was transferred into a 60 mL plastic syringe. The ram was fitted over the viscous mixture. The mixture was then pumped back and forth through 3 cycles using a motorized worm gear driven ram into an identically equipped syringe coupled head to head with the first syringe via a Luer Lock coupler.

Fiber Spinning (117134-82)

Table 2 gives the spinning conditions that were used for the fibers prepared in Examples 1-9. (117134-82-1-9) The apparatus depicted in FIG. 1, as described supra, was modified by removal of the driven roll, 10, from the filament pathway in Examples 1-8. The indicated spin stretch was attained by running the windup faster than the jet velocity. Spinning solution S1 was metered at the rates shown in Table 2 through a spin pack having a filter assembly consisting of 100 and 325 mesh screens to spinnerets having 0.003 inch diameter holes. The exit of the spinneret was immersed into a glacial acetic acid quench bath and the filament was extruded directly into the glacial acetic acid at the temperature indicated in Table 2. Additional length in the 6 foot long coagulation bath was increased by directing the fiber over additional guide pins (8) for a total immersion distance of 4.25 or 12.25 ft as indicated. Upon removal from the glacial acetic acid coagulation bath the thus coagulated filament was directed to a speed controlled wind-up with a traversing guide, at wind-up speeds shown in Table 2. The fiber bobbins were soaked overnight in the media shown in Table 2 and then removed and allowed to air dry before being subjected to physical measurements.

TABLE 2

| Example | Polymer | Spinning Solution. | # Holes | Hole Diameter (in) | Hole Length | PUMP RATE ml/min | JET VEL (fpm) | Coag. Liquid | Coag. Bath Length (ft) | Coag. Bath Temp. (° C.) | Driven Roll Speed (fpm) |
|---|---|---|---|---|---|---|---|---|---|---|---|
| 1 | P1 | S1 | 4/5 | 0.003 | 0.006 | 0.31 | 14 | Glacial Acetic Acid | 4.25 | 28 | NA |
| 2 | P1 | S1 | 4/5 | 0.003 | 0.006 | 0.31 | 14 | Glacial Acetic Acid | 4.25 | 28 | NA |
| 3 | P1 | S1 | 4/5 | 0.003 | 0.006 | 0.31 | 14 | Glacial Acetic Acid | 4.25 | 28 | NA |
| 4 | P1 | S1 | 4/5 | 0.003 | 0.006 | 0.31 | 14 | Glacial Acetic Acid | 4.25 | 28 | NA |
| 5 | P1 | S1 | 3/5 | 0.003 | 0.006 | 0.31 | 14 | Glacial Acetic Acid | 4.25 | 29 | NA |
| 6 | P1 | S1 | 3/5 | 0.003 | 0.006 | 0.31 | 14 | Glacial Acetic Acid | 12.25 | 29 | NA |
| 7 | P1 | S1 | 15 | 0.003 | 0.012 | 0.57 | 27 | Glacial Acetic Acid | 12.25 | 29 | NA |
| 8 | P1 | S1 | 15 | 0.003 | 0.012 | 0.57 | 27 | Glacial Acetic Acid | 12.25 | 29 | NA |
| 9 | P1 | S1 | 15 | 0.003 | 0.012 | 0.57 | 27 | Glacial Acetic Acid | 12.25 | 29 | 51 |
| 10 | P2 | S2 | 15 | 0.003 | 0.012 | 0.55 | 27 | Glacial Acetic Acid | 4.25 | 28 | NA |
| 11 | P2 | S2 | 15 | 0.003 | 0.012 | 0.55 | 27 | Glacial Acetic Acid | 12.25 | 28 | NA |
| 12 | P2 | S2 | 15 | 0.003 | 0.012 | 0.55 | 27 | Glacial Acetic Acid | 12.25 | 28 | NA |
| 13 | P2 | S2 | 15 | 0.003 | 0.012 | 0.55 | 27 | Glacial Acetic Acid | 12.25 | 28 | NA |
| 14 | P2 | S2 | 15 | 0.003 | 0.012 | 0.55 | 27 | Glacial Acetic Acid | 12.25 | 28 | NA |
| 15 | P2 | S2 | 15 | 0.003 | 0.012 | 0.55 | 27 | Glacial Acetic Acid | 12.25 | 28 | NA |
| 16 | P2 | S2 | 15 | 0.003 | 0.012 | 1.50 | 71 | Glacial Acetic Acid | 12.25 | 28 | NA |
| 17 | P2 | S2 | 15 | 0.003 | 0.012 | 1.50 | 71 | Glacial Acetic Acid | 12.25 | 28 | NA |
| 18 | P2 | S2 | 15 | 0.003 | 0.012 | 1.50 | 71 | Glacial Acetic Acid | 12.25 | 28 | NA |
| 19 | P2 | S3 | 20 | 0.003 | 0.006 | 0.85 | 30 | Glacial Acetic Acid | 12.4 | 20 | NA |
| 20 | P2 | S3 | 20 | 0.003 | 0.006 | 0.85 | 30 | Glacial Acetic Acid | 12.4 | 25 | NA |

TABLE 2-continued

| | | | | | | | | | | | |
|---|---|---|---|---|---|---|---|---|---|---|---|
| 21 | P2 | S3 | 20 | 0.003 | 0.006 | 1.70 | 60 | Glacial Acetic Acid | 12.4 | 25 | NA |
| 22 | P2 | S3 | 20 | 0.003 | 0.006 | 1.70 | 60 | Glacial Acetic Acid | 12.4 | 25 | NA |
| 23 | P2 | S3 | 20 | 0.003 | 0.006 | 0.85 | 30 | Glacial Acetic Acid | 4.8 | 24 | NA |
| 24 | P2 | S3 | 20 | 0.003 | 0.006 | 0.85 | 30 | Glacial Acetic Acid | 4.8 | 24 | NA |
| 25 | P2 | S3 | 20 | 0.003 | 0.006 | 0.85 | 30 | Glacial Acetic Acid | 4.8 | 24 | NA |
| 26 | P2 | S3 | 20 | 0.003 | 0.006 | 0.85 | 30 | Glacial Acetic Acid | 4.8 | 24 | NA |
| 27 | P2 | S3 | 20 | 0.003 | 0.006 | 0.85 | 30 | Glacial Acetic Acid | 4.8 | 24 | NA |
| 28 | P3 | S4 | 20 | 0.003 | 0.006 | 0.85 | 31 | Glacial Acetic Acid | 12.4 | 26 | NA |
| 29 | P3 | S4 | 20 | 0.003 | 0.006 | 0.85 | 31 | Glacial Acetic Acid | 12.4 | 25 | 36 |
| 30 | P4 | S5 | 20 | 0.003 | 0.006 | 0.85 | 31 | Glacial Acetic Acid | 4.8 | 24 | NA |
| 31 | P4 | S5 | 20 | 0.003 | 0.006 | 0.85 | 31 | Glacial Acetic Acid | 4.8 | 24 | NA |
| 32 | P4 | S5 | 15 | 0.004 | 0.016 | 1.62 | 37 | Glacial Acetic Acid | 4.8 | 25 | NA |
| 33 | P4 | S5 | 15 | 0.004 | 0.016 | 0.85 | 22 | Glacial Acetic Acid | 8.1 | 25 | NA |
| 34 | P4 | S5 | 15 | 0.004 | 0.016 | 0.85 | 22 | Glacial Acetic Acid | 8.1 | 25 | NA |
| 35 | P5 | S6 | 20 | 0.003 | 0.006 | 0.85 | 31 | Glacial Acetic Acid | 12.4 | 25 | NA |
| 36 | P5 | S6 | 20 | 0.003 | 0.006 | 0.85 | 31 | Glacial Acetic Acid | 12.4 | 25 | NA |
| 37 | P5 | S6 | 20 | 0.003 | 0.006 | 0.85 | 31 | Glacial Acetic Acid | 12.4 | 25 | NA |
| 38 | P5 | S6 | 20 | 0.003 | 0.006 | 0.85 | 31 | 20% H2SO4 | 4.2 | 25 | NA |
| 39 | P5 | S6 | 20 | 0.003 | 0.006 | 0.85 | 31 | 20% H2SO4 | 4.2 | 25 | NA |
| 40 | P5 | S6 | 20 | 0.003 | 0.006 | 0.85 | 31 | 20% H2SO4 | 2 | 25 | NA |
| 41 | P5 | S6 | 20 | 0.003 | 0.006 | 0.85 | 31 | 20% H2SO4 | 1.25 | 25 | NA |
| 42 | P5 | S6 | 20 | 0.003 | 0.006 | 0.85 | 31 | 20% H2SO4 | 1.25 | 25 | NA |
| 43 | P5 | S6 | 20 | 0.003 | 0.006 | 0.85 | 31 | 20% H2SO4 | 1.25 | 25 | NA |
| 44 | P4, P6, P7 | S7 | 20/19 | 0.003 | 0.006 | 1.10 | 37 | 5% H2SO4 | 4.1 | 17 | NA |
| 45 | P4, P6, P7 | S7 | 20/19 | 0.003 | 0.006 | 1.10 | 37 | 5% H2SO4 | 4.1 | 16 | 41 |
| 46 | P4, P6, P7 | S7 | 20/19 | 0.003 | 0.006 | 1.10 | 37 | 5% H2SO4 | 4.1 | 15 | 41 |
| 47 | P4, P6, P7 | S7 | 20/19 | 0.003 | 0.006 | 2.10 | 75 | 5% H2SO4 | 4.1 | 11 | 65 |
| 48 | P4, P6, P7 | S7 | 20/19 | 0.003 | 0.006 | 2.10 | 75 | 5% H2SO4 | 4.1 | 11 | 79 |
| 49 | P4, P6, P7 | S7 | 20/19 | 0.003 | 0.006 | 2.10 | 75 | 5% H2SO4 | 4.1 | 11 | 120 |
| 50 | P8 | S8 | 20 | 0.003 | 0.006 | 1.10 | 37 | 5% H2SO4 | 2.1 | 9 | NA |
| 51 | P8 | S8 | 20 | 0.003 | 0.006 | 1.10 | 37 | 5% H2SO4 | 3 | 9 | NA |
| 52 | P8 | S8 | 20 | 0.003 | 0.006 | 1.10 | 37 | 5% H2SO4 | 2.66 | 9 | NA |
| 53 | P8 | S8 | 20 | 0.003 | 0.006 | 1.10 | 37 | 5% H2SO4 | 2.5 | 9 | NA |
| 54 | P8 | S8 | 20 | 0.003 | 0.012 | 2.10 | 75 | 5% H2SO4 | 4.33 | 7 | NA |
| 55 | P8 | S8 | 20 | 0.003 | 0.012 | 2.10 | 75 | 5% H2SO4 | 4.33 | 7 | NA |
| 56 | P9, P10 | S9 | 20 | 0.003 | 0.006 | 1.10 | 37 | Glacial Acetic Acid | 4 | 27 | NA |
| 57 | P9, P10 | S9 | 20 | 0.003 | 0.006 | 1.10 | 37 | Glacial Acetic Acid | 4 | 27 | NA |
| 58 | P9, P10 | S9 | 20 | 0.003 | 0.006 | 1.10 | 37 | Glacial Acetic Acid | 4 | 27 | NA |
| 59 | P9, P10 | S9 | 20 | 0.003 | 0.006 | 1.10 | 37 | Glacial Acetic Acid | 4 | 27 | 50 |
| 60 | P9, P10 | S9 | 20 | 0.003 | 0.006 | 1.10 | 37 | Glacial Acetic Acid | 4 | 28 | NA |
| 61 | P9, P10 | S9 | 20 | 0.003 | 0.006 | 1.10 | 37 | Glacial Acetic Acid | 4 | 29 | 67 |
| 62 | P9, P10 | S9 | 20 | 0.003 | 0.006 | 1.10 | 37 | Glacial Acetic Acid | 4 | 29 | NA |
| 63 | P9, P10 | S9 | 20 | 0.003 | 0.006 | 1.10 | 37 | Glacial Acetic Acid | 4 | 29 | NA |
| 64 | P11 | S10 | 20 | 0.003 | 0.006 | 1.10 | 37 | glacial Acetic Acid | 4.2 | 17 | NA |
| 65 | P11 | S10 | 20 | 0.003 | 0.006 | 1.10 | 37 | glacial Acetic Acid | 4.2 | 16 | NA |
| 66 | P11 | S10 | 20 | 0.003 | 0.006 | 4.20 | 150 | glacial Acetic Acid | 1.25 | 15 | NA |
| 67 | P11 | S10 | 20 | 0.003 | 0.006 | 1.10 | 37 | glacial Acetic Add | 4.2 | 16 | NA |
| 68 | P11 | S10 | 20 | 0.003 | 0.006 | 1.10 | 37 | glacial Acetic Acid | 4.2 | 16 | NA |

TABLE 2-continued

| | | | | | | | | | | | |
|---|---|---|---|---|---|---|---|---|---|---|---|
| 69 | P11 | S11 | 20 | 0.003 | 006 | 0.85 | 30 | 5% H2SO4 5% Na2SO4 1% ZnSO4 | 4'7" | 26 | NA |
| 70 | P11 | S11 | 20 | 0.003 | 006 | 0.85 | 30 | 5% H2SO4 5% Na2SO4 1% ZnSO4 | 3' | 26 | NA |
| 71 | P11 | S11 | 20 | 0.003 | 006 | 2.65 | 92 | 5% H2SO4 5% Na2SO4 1% ZnSO4 | 32" | 26 | NA |
| 72 | P11 | S11 | 20 | 0.003 | 006 | 2.65 | 92 | 5% H2SO4 5% Na2SO4 1% ZnSO4 | 25" | 26 | 49 |
| 73 | P11 | S11 | 20 | 0.003 | 006 | 2.65 | 92 | 5% H2SO4 5% Na2SO4 1% ZnSO4 | 4'7" | 27 | NA |
| 74 | P11 | S12 | 20 | 0.003 | 0.006 | 0.52 | 18.6 | 10% H2SO4 1% ZnSO4 | 4.5 | 26 | NA |
| 75 | P11 | S12 | 20 | 0.003 | 0.006 | 0.52 | 18.6 | 10% H2SO4 1% ZnSO4 | 4.5 | 26 | NA |
| 76 | P11 | S12 | 20 | 0.003 | 0.006 | 0.52 | 18.6 | 10% H2SO4 1% ZnSO4 | 4.5 | 26 | NA |
| 77 | P11 | S12 | 20 | 0.003 | 0.006 | 0.52 | 18.6 | 10% H2SO4 1% ZnSO4 | 4.5 | 26 | NA |
| 78 | P11 | S12 | 20 | 0.003 | 0.006 | 0.52 | 18.6 | 10% H2SO4 1% ZnSO4 | 4.5 | 26 | NA |
| 79 | P11 | S12 | 20 | 0.003 | 0.006 | 0.52 | 18.6 | 10% H2SO4 1% ZnSO4 | 4.5 | 26 | NA |
| 80 | P11 | S12 | 20 | 0.003 | 0.006 | 0.52 | 18.6 | 10% H2SO4 1% ZnSO4 | 4.5 | 26 | NA |
| 81 | P11 | S12 | 20 | 0.003 | 0.006 | 0.52 | 18.6 | 10% H2SO4 5% Na2SO4 5% ZnSO4 | 4.5 | 26 | NA |
| 82 | P11 | S12 | 20 | 0.003 | 0.006 | 0.52 | 18.6 | 10% H2SO4 5% Na2SO4 5% ZnSO4 | 4.5 | 26 | NA |
| 83 | P11 | S12 | 20 | 0.003 | 0.006 | 0.52 | 18.6 | 10% H2SO4 5% Na2SO4 5% ZnSO4 | 4.5 | 26 | NA |
| 84 | P11 | S12 | 20 | 0.003 | 0.006 | 0.52 | 18.6 | 10% H2SO4 5% Na2SO4 5% ZnSO4 | 4.5 | 26 | NA |
| 85 | P11 | S12 | 20 | 0.003 | 0.006 | 0.52 | 18.6 | 10% H2SO4 5% Na2SO4 5% ZnSO4 | 4.5 | 26 | NA |

| Example | Draw Bath Liquid | Draw Bath Length (ft) | Draw Bath Temp. (° C.) | Wind-Up Speed (fpm) | S.S.F. | T gpd | E % | M gpd | DENIER | Overnight Soak Liquid |
|---|---|---|---|---|---|---|---|---|---|---|
| 1 | NA | NA | NA | 51 | 3.6 | 0.9 | 10.1 | 49.0 | 5.0 | H2O |
| 2 | NA | NA | NA | 83 | 5.9 | 0.9 | 10.3 | 50.7 | 5.1 | H2O |
| 3 | NA | NA | NA | 101 | 7.2 | 0.9 | 8.2 | 52.6 | 4.6 | H2O |
| 4 | NA | NA | NA | 57 | 4.1 | 0.7 | 13.5 | 39.0 | 12.4 | H2O |
| 5 | NA | NA | NA | 45 | 3.2 | 0.7 | 12.4 | 40.0 | 15.3 | H2O |
| 6 | NA | NA | NA | 64 | 4.6 | 0.7 | 14.9 | 40.4 | 16.4 | H2O |
| 7 | NA | NA | NA | 63 | 2.3 | 0.8 | 9.1 | 46.6 | 3.6 | MeOH |
| 8 | NA | NA | NA | 63 | 2.3 | 0.9 | 9.7 | 45.6 | 4.8 | MeOH |
| 9 | NA | NA | NA | 57 | 2.1 | 0.8 | 11.9 | 41.2 | 6.2 | MeOH |
| 10 | NA | NA | NA | 67 | 2.5 | 1.0 | 6.4 | 64.0 | 42 | MeOH |
| 11 | NA | NA | NA | 57 | 2.1 | 0.8 | 5.9 | 47.8 | 56 | MeOH |
| 12 | NA | NA | NA | 57 | 2.1 | 1.0 | 4.6 | 63.3 | 49 | MeOH |
| 13 | NA | NA | NA | 49 | 1.8 | 1.1 | 6.3 | 63.7 | 53 | MeOH |
| 14 | NA | NA | NA | 34 | 1.3 | 0.8 | 7.9 | 44.7 | 96 | MeOH |
| 15 | NA | NA | NA | 20 | 0.7 | 0.8 | 9.7 | 45.2 | 132 | MeOH |
| 16 | NA | NA | NA | 88 | 1.2 | 1.2 | 5.0 | 88.2 | 56 | MeOH |
| 17 | NA | NA | NA | 88 | 1.2 | NT | NT | NT | NT | MeOH |
| 18 | NA | NA | NA | 88 | 1.2 | NT | NT | NT | NT | MeOH |
| 19 | NA | NA | NA | 40 | 1.3 | 0.9 | 4.7 | 63.9 | 104 | MeOH |
| 20 | water | 2.5 | 69 | 14 | 0.5 | 0.9 | 5.7 | 51.5 | 201 | MeOH |
| 21 | NA | NA | NA | 70 | 1.2 | 1.0 | 4.3 | 63.4 | 125 | MeOH |
| 22 | NA | NA | NA | 61 | 1.0 | 1.0 | 4.8 | 60.6 | 135 | MeOH |
| 23 | NA | NA | NA | 41 | 1.4 | 0.9 | 5.9 | 54.8 | 105 | MeOH |
| 24 | NA | NA | NA | 82 | 2.7 | NT | NT | NT | NT | MeOH |
| 25 | water | 2.5 | 81 | 51 | 1.7 | 0.9 | 4.6 | 57.1 | 90 | MeOH |
| 26 | water | 2.5 | 82 | 38 | 1.3 | 1.3 | 4.5 | 82.3 | 75 | MeOH |
| 27 | water | 2.5 | 82 | 51 | 1.7 | 0.9 | 4.1 | 56.0 | 90 | MeOH |
| 28 | NA | NA | NA | 33 | 1.1 | 0.9 | 4.3 | 55.8 | 115 | MeOH |
| 29 | wet | 2.0 | 81 | 36 | 1.2 | 0.9 | 3.8 | 59.6 | 105 | MeOH |
| 30 | NA | NA | NA | 30 | 1.0 | NT | NT | NT | NT | MeOH |

TABLE 2-continued

| | | | | | | | | | |
|---|---|---|---|---|---|---|---|---|---|
| 31 | NA | NA | NA | 47 | 1.5 | 0.5 | 1.6 | 42.7 | 100 | MeOH |
| 32 | NA | NA | NA | 37 | 1.0 | NT | NT | NT | NT | MeOH |
| 33 | NA | NA | NA | 12 | 0.5 | NT | NT | NT | NT | MeOH |
| 34 | NA | NA | NA | 18 | 0.8 | NT | NT | NT | NT | MeOH |
| 35 | NA | NA | NA | 30 | 1.0 | 0.8 | 7.2 | 50.1 | 185 | MeOH |
| 36 | NA | NA | NA | 50 | 1.6 | 1.0 | 6.7 | 56.8 | 112 | MoOH |
| 37 | water | 2.1 | 85 | 24 | 0.8 | 0.8 | 6.6 | 50.7 | 218 | MeOH |
| 38 | NA | NA | NA | 42 | 1.4 | 0.9 | 5.4 | 59.1 | 125 | 5% NaHCO3 |
| 39 | NA | NA | NA | 42 | 1.4 | 0.9 | 5.9 | 51.7 | 145 | 5% NaHCO3 |
| 40 | water | 2.1 | 80 | 20 | 0.6 | 0.8 | 5.3 | 50.8 | 250 | 5% NaHCO3 |
| 41 | water | 2.1 | 78 | 32 | 1.0 | 0.9 | 6.4 | 52.4 | 170 | 5% NaHCO3 |
| 42 | water | 2.1 | 80 | 50 | 1.6 | 0.9 | 5.1 | 56.4 | 125 | 5% NaHCO3 |
| 43 | water | 2.1 | 83 | 40 | 1.3 | 0.7 | 2.0 | 56.4 | 120 | 5% NaHCO3 |
| 44 | NA | NA | NA | 29 | 0.8 | 1.3 | 4.1 | 85.9 | 125 | 5% NaHCO3 |
| 45 | water | 2.5 | 80 | 43 | 1.2 | 1.1 | 3.0 | 74.2 | 100 | 5% NaHCO3 |
| 46 | water | 2.5 | 79 | 46 | 1.2 | 0.9 | 4.1 | 56.8 | 125 | 5% NaHCO3 |
| 47 | water | 2.5 | 82 | 70 | 0.9 | NT | NT | NT | NT | 5% NaHCO3 |
| 48 | water | 2.5 | 83 | 85 | 1.1 | NT | NT | NT | NT | 5% NaHCO3 |
| 49 | water | 2.5 | 83 | 120 | 1.6 | NT | NT | NT | NT | 5% NaHCO3 |
| 50 | water | 1.75 | 53 | 57 | 1.5 | NT | NT | NT | NT | 5% NaHCO3 |
| 51 | water | 1.75 | 53 | 80 | 2.2 | NT | NT | NT | NT | 5% NaHCO3 |
| 52 | NA | NA | NA | 96 | 2.6 | NT | NT | NT | NT | 5% NaHCO3 |
| 53 | NA | NA | NA | 120 | 3.2 | NT | NT | NT | NT | 5% NaHCO3 |
| 54 | NA | NA | NA | 79 | 1.1 | NT | NT | NT | NT | 5% NaHCO3 |
| 55 | NA | NA | NA | 99 | 1.3 | NT | NT | NT | NT | 5% NaHCO3 |
| 56 | water | 0.33 | 78 | 25 | 0.7 | 0.6 | 2.2 | 44.6 | 220 | 5% NaHCO3 |
| 57 | water | 1 | 78 | 64 | 1.7 | 0.8 | 3.8 | 53.3 | 100 | 5% NaHCO3 |
| 58 | NA | NA | NA | 64 | 1.7 | 0.8 | 4.3 | 54.0 | 100 | 5% NaHCO3 |
| 59 | water | 1.83 | 78 | 55 | 1.5 | NT | NT | NT | NT | 5% NaHCO3 |
| 60 | NA | NA | NA | 75 | 2.0 | 1.0 | 4.0 | 62.5 | 80 | 5% NaHCO3 |
| 61 | water | 0.33 | 78 | 63 | 1.7 | 0.7 | 2.5 | 45.9 | 100 | 5% NaHCO3 |
| 62 | methanol | 1.75 | −43 | 65 | 1.8 | 1.0 | 5.2 | 60.8 | 82 | MeOH |
| 63 | methanol | 1.75 | −38 | 81 | 2.2 | 0.8 | 4.7 | 46.3 | 75.0 | MeOH |
| 64 | NA | NA | NA | 50 | 1.4 | 1.0 | 6.3 | 54.0 | 120 | MeOH |
| 65 | water | 2.1 | 51 | 63 | 1.7 | 1.0 | 4.9 | 56.5 | 100 | MeOH |
| 66 | NA | NA | NA | 149 | 1.0 | 1.0 | 4.2 | 62.9 | 150 | MeOH |
| 67 | methanol | 2.2 | −31 | 42 | 1.1 | 1.0 | 6.9 | 56.5 | 160 | MeOH |
| 68 | methanol | 0.33 | −11 | 93 | 2.5 | 1.1 | 6.1 | 60.2 | 80 | MeOH |
| 69 | 5% Na bicarb | NA | NA | 53 | 1.8 | | | | | 5% NaHCO3 |
| 70 | 5% Na bicarb | 20″ | 53 | 30 | 1.0 | | | | | MeOH, then 5% NaHCO3 |
| 71 | 5% Na bicarb | 20″ | 53 | 30 | 0.3 | | | | | 5% NaHCO3 |
| 72 | 5% Na bicarb | NA | NA | 47 | 0.5 | | | | | 5% NaHCO3 |
| 73 | 5% Na bicarb | 12″ | 53 | 73 | 0.8 | | | | | 5% NaHCO3 |
| 74 | NA | NA | NA | 38 | 2.0 | 1.2 | 3.4 | 89.2 | 55 | 5% NaHCO3/tap water/air dry |
| 75 | NA | NA | NA | 50 | 2.7 | 1.1 | 1.9 | 84.6 | 45 | 5% NaHCO3/tap water/air dry |
| 76 | 5% NaHCO3 | 2 | 47 | 36 | 1.9 | 1.5 | 3.0 | 102.9 | 50 | 5% NaHCO3/tap water/air dry |
| 77 | 5% NaHCO3 | 2 | 51 | 49 | 2.6 | 1.0 | 2.2 | 70.4 | 52 | 5% NaHCO3/tap water/air dry |
| 78 | 5% NaHCO3 | 18 | 52 | 23 | 1.2 | 1.2 | 3.4 | 71.7 | 97 | 5% NaHCO3/tap water/air dry |
| 79 | 5% NaHCO3 | 19 | 52 | 31 | 1.7 | 1.4 | 4.6 | 75.8 | 80 | 5% NaHCO3/tap water/air dry |
| 80 | 5% NaHCO3 | 21 | 52 | 25 | 1.3 | 1.1 | 4.5 | 61.7 | 115 | 5% NaHCO3/tap water/air dry |
| 81 | NA | NA | NA | 50 | 2.7 | 1.1 | 3.7 | 75.6 | 52 | 5% NaHCO3/tap water/air dry |
| 82 | NA | NA | NA | 33 | 1.8 | 1.1 | 4.0 | 76.3 | 52 | 5% NaHCO3/tap water/air dry |
| 83 | NA | NA | NA | 21 | 1.1 | 1.0 | 6.0 | 58.7 | 120 | 5% NaHCO3/tap water/air dry |
| 84 | NA | NA | NA | 58 | 3.1 | 0.7 | 2.5 | 47.2 | 65 | 5% NaHCO3/tap water/air dry |
| 85 | NA | NA | NA | 24 | 1.3 | 0.9 | 4.1 | 54.7 | 180 | 5% NaHCO3/tap water/air dry |

Examples 10-18

Preparation of Polymer P2 (E117134-83)

E116007-42 Method

Three liters of an aqueous solution was prepared by combining 15% sucrose (VWR #BDH8029), Dextran T-10 6 g (Sigma #D9260), 3 g of BN biocide from Arch and potassium phosphate buffer adjusted to pH 6.8-7.0. All of the ingredients were added in the concentrations listed in Table 1. The pH was adjusted and the volume brought up to 3 liters. The solution was then charged with enzyme extract 20.1 mL (0.67 volume percent) prepared supra and allowed to stand at ambient temperature for 144 hours. The resulting glucan solids were collected, filtered, and washed following the procedures of Examples 1-9. Yield: 42.9 grams of white flaky solids.

The Mn and Mw were determined to be 85041 and 174664 respectively. The 13C NMR spectrum was consistent with dextran primed glucan polymer as described in the preparation of polymer P1.

Spinning Solution S2 (117134-83)

The procedures for making the spinning solutions of Examples 1-10 were replicated except that the partially dissolved solution was allowed to stand for 4 hours at ambient temperature The method of syringe mixing described in the preparation of S1 was also followed.

Fiber Spinning (117134-84)

Table 2 gives the spinning conditions that were used for the fibers prepared in Examples 10-18. The apparatus depicted in FIG. 1, as described supra, was modified by removal of the driven roll, 10, and bath 11, from the filament pathway. Spin stretch was attained by running the windup faster than the jet velocity. The spinning solution thus prepared was metered at the rates shown in Table 2 through a spin pack having a filter assembly consisting of 100 and 325 mesh screens to spinnerets having 0.003 inch diameter holes. The filament was extruded directly into glacial acetic acid before being immersed in and traversing coagulation bath containing glacial acetic acid at the temperature indicated in Table 1. Additional length in the 6 foot long coagulation bath was increased by directing the fiber over additional guide pins (8) for a total immersion distance of 4.3 or 12.3 ft. Upon removal from the coagulation bath the thus coagulated filament was directed to a speed controlled wind-up with a traversing guide, at wind-up speeds shown in Table 2. The fiber bobbins were soaked overnight in the media shown in Table 2 and then removed and allowed to air dry before being subjected to physical measurements.

Examples 19-27

Spinning Solution S3 (117134-89)

A 250 mL wide mouth glass bottle was charged with 32 g of Polymer P2 and 180 g of 5 wt % sodium hydroxide. The container was fitted with a cap through which a polypropylene stirring rod had been fitted through a septum. The contents were manually mixed with the plastic stirrer and then placed in a refrigerator at 5 degrees Centigrade for overnight. The following day the partially dissolved solution was transferred into a 300 mL stainless steel cylinder fitted with 2×100 mesh, 1×325 mesh and 2×100 mesh stainless steel screens. A stainless steel piston was fitted over the viscous mixture and it was pumped back and forth through 13 cycles using a motorized worm gear driven ram into an identically equipped stainless steel cylinder/piston/screen assembly coupled head to head to the first cylinder assembly via ¼" stainless steel tubing coupler.

Fiber Spinning (117134-90)

Table 2 gives the spinning conditions that were used for the fibers prepared in Examples 19-27. The apparatus depicted in FIG. 1, as described supra, was modified by removal of the driven roll, 10, from the filament pathway for fiber samples for (117134-90-1-9). The pathway for fiber samples for (117134-90-4, 7-9) was attained by running the fibers through a water bath, 11 in FIG. 1, temperature and length as shown in Table 1. The spinning solution thus prepared was metered at the rates shown in Table 1 through a spin pack having a filter assembly consisting of 100 and 325 mesh screens to spinnerets having 0.003 inch diameter holes. The filament was extruded directly into glacial acetic acid at the temperature indicated in Table 1. Additional length in the 6 foot long coagulation bath was increased by directing the fiber over additional guide pins (8) for a total immersion distance of 4.8 or 12.4 ft. Upon removal from the coagulation bath the thus coagulated filament was directed to a speed controlled wind-up with a traversing guide, at wind-up speeds shown in Table 1. The fiber bobbins were soaked overnight in the media shown in table 1 and then removed and allowed to air dry before being subjected to physical measurements.

Example 28 and 29

Preparation of Polymer P3 (E117134-91)

E117134-87 Method

Three liters of an aqueous solution were prepared by combining 15% sucrose (VWR #BDH8029), Dextran T-10 3 g (Sigma #D9260), potassium phosphate buffer was adjusted to pH 7.0 using KOH. Boric acid was then added to a concentration of 300 mM. All of the ingredients were added in the amount listed in table 1. The pH was then adjusted to 7.5 using NaOH causing the boric acid to dissolve. Total volume was then brought up to 3 liters using deionized water. The solution was then charged with 17 mL of the enzyme solution prepared supra and allowed to stand at ambient temperature for 48 hours. The resulting glucan solids were filtered, washed, and dried as in the preparation of P2. Yield was 36.5 grams of white flaky solids. The Mn and Mw were determined to be 126,366 and 240,689 Daltons respectively. The 13C NMR spectrum was consistent with dextran primed glucan polymer as described in Example 1.

Spinning Solution S4 (117134-91)

Spinning Solution S4 was prepared in a manner identical to that of S3 with the following changes:
- 24.55 g of polymer P3 in place of 32 g of polymer P2 were charged to the bottle.
- Mixing using the stainless steel cylinders was performed for 9 cycles, followed by refrigeration overnight at 5° C., followed by 4 further mixing cycles.

Fiber Spinning (117134-92)

Table 2 gives the spinning conditions that were used for the fibers prepared in Examples 28 and 29. The apparatus depicted in FIG. 1, as described supra, was modified by removal of the driven roll, 10, from the filament pathway for fiber samples for (117134-92-1). The pathway for fiber samples for (117134-92-2) was attained by running the fiber through a water bath, 11 in FIG. 1, the temperature and length as shown in Table 2. Spin stretch was attained by running the windup faster than the jet velocity. The spinning solution thus prepared was metered at the rates shown in Table 2 through a spin pack having a filter assembly consisting of 100 and 325 mesh screens to spinnerets having 0.003 inch diameter holes. The filament was extruded directly into glacial acetic acid at the temperature indicated in Table 2. Additional length in the 6 foot long coagulation bath was increased by directing the fiber over additional guide pins (8) for a total immersion distance of 12.4 ft. Upon removal from the coagulation bath the thus coagulated filament was directed to a speed controlled wind-up with a traversing guide, at wind-up speeds shown in Table 2. The fiber bobbins were soaked overnight in the media shown in Table 2 and then removed and allowed to air dry before being subjected to physical measurements.

Examples 30-34

Preparation of Polymer P4 (E117134-93)

E117134-20 Method

Three liters of an aqueous solution was prepared by combining 15% sucrose (VWR #BDH8029), Dextran T-10 (Sigma #D9260), undenatured ethanol (Sigma Aldrich #459844) and potassium phosphate buffer adjusted to pH 6.8-7.0. All of the ingredients were added in the amount listed in Table 1. The pH was adjusted and the volume was brought up to 3 liters with deionized water. The solution was then charged with 20.1 mL of the enzyme extract (0.67 volume per cent) prepared supra, and allowed to stand at ambient temperature for 144 hours. The resulting glucan solids were filtered, washed, and dried as in the preparation of polymer P3. Yield was 37.3 grams of white flaky solids. The $M_n$ and $M_w$ were determined to be 64,863 and 168,120 Daltons respectively. The 13C NMR spectrum was consistent with dextran primed glucan polymer as described in Example 1.

Spinning Solution S5 (117134-93)

Spinning Solution S5 was prepared in a manner identical to that of S3 with the following changes:
20 g of polymer P4 in place of 32 g of polymer P2 were charged to the bottle.
After manual mixing with the stirrer, the solution was refrigerated overnight at 5° C.
Following the overnight refrigeration, the solution was charged to the stainless steel cylinder apparatus, and mixed for 13 cycles.

Fiber Spinning (117134-94)

Table 2 gives the spinning conditions that were used for the fibers prepared in Examples 30-34. The methods and equipment were the same as for Examples 1-9, except as indicated in Table 2. Note that fibers of Examples 32-34 were spun through a spinneret having hole diameter of 0.004 in.

Examples 35-43

Preparation of Polymer P5 (E117134-95

E116007-43 Method

Three liters of an aqueous solution were prepared by combining 15% sucrose, Dextran T-10, LA biocide from Thor, and potassium phosphate buffer adjusted to pH 6.8-7.0 with KOH were combined as indicated in Table 1, following the procedures for preparing P3. After the adjustment of pH and addition of the enzyme extract, the solution was allowed to stand at ambient temperature for 144 hours. The resulting glucan solids were filtered, washed, and dried as in the preparation of P3. Yield: 44.1 grams of white flaky solids. The 13C NMR spectrum was consistent with dextran primed glucan polymer as described in example 1.

Spinning Solution S6 (117134-95)

Spinning Solution S6 was prepared in a manner identical to that of S5 except that 36.86 g polymer P5 was employed in place of the 20 g of polymer P4.

Fiber Spinning (117134-96)

Table 2 gives the spinning conditions that were used for the fibers prepared in Examples 30-43. The methods and equipment were the same as for Examples 1-9, except as indicated in Table 2. Note that the fibers of Examples 35-37 were quenched in glacial acetic acid, while the fibers of Examples 38-43 were quenched in 20% by weight aqueous $H_2SO_4$.

Examples 44-49

Preparation of Polymer P6 (E117134-97)

E117134-21 Method

The procedures employed in preparing polymer P5 were replicated, with the ingredient amounts shown in Table 1. Yield was 47.3 grams of white flaky solids, the Mn and Mw were determined to be 64,863 and 168,120 Daltons respectively. The 13C NMR spectrum was consistent with dextran primed glucan polymer as described in Example 1.

Preparation of Polymer P7 (E117134-97)

E116007-23 Method

As shown in Table 1, the materials and procedures in preparing polymer P6 were replicated except that 3 g of Destran T-10 were employed. Yield was 32.1 grams of white flaky solids. The Mn and Mw were determined to be 154,217 and 350,847 Daltons respectively. The 13C NMR spectrum was consistent with dextran primed glucan polymer as described in example 1.

Spinning Solution S7 (117134-97)

The procedures and materials used to prepare Spinning Solution S6 were replicated except that the polymer employed consisted of 15.0 g of Polymer P4, 19 g of Polymer P6, and 2.86 g of Polymer P7.

Fiber Spinning (Example Series 117134-98)

Table 2 gives the spinning conditions that were used for the fibers prepared in Examples 44-49. The apparatus and procedures employed for preparing Examples 35-43 were replicated. Note that quenching was effected using 5 wt % aqueous $H_2SO_4$.

Examples 50-55

Preparation of Polymer 8 (E117134-101)

E116007-116-3 Method

15% sucrose, Dextran T-10, undenatured ethanol, and potassium phosphate buffer adjusted to pH 6.8-7.0 were combined in the amounts shown in Table 1. The pH was adjusted, and the volume was brought up to 190 liters with deionized water. The solution was then charged with 1.9 L of the enzyme extract prepared supra and allowed to stand at ambient temperature with periodic stirring for 72 hours. The resulting glucan solids were collected on a Buchner funnel using a 325 mesh screen over 40 micron filter paper. The filter cake was suspended in deionized water and filtered twice more as above to remove sucrose, fructose and other low molecular weight, soluble by products. The batch was split into three portions and two additional washes with methanol were carried out, the filter cake was pressed out on the funnel and dried in vacuum at room temperature. Yield: 1439 grams of white flaky solids. The Mn and Mw were determined to be 72147 and 143486 Daltons respectively. The $^{13}$C NMR spectrum was consistent with dextran primed glucan polymer as described in Example 1.

Spinning Solution S8 (117134-101)

The materials and procedures employed for the preparation of Spinning Solution S3 were replicated except that 34.29 g of Polymer P8 were employed in place of 32 g of Polymer P2.

Fiber Spinning (117134-102)

Table 2 gives the spinning conditions that were used for the fibers prepared in Examples 50-55. The equipment and procedures were the same as in the preparation of Examples 19-27, with the differences shown in Table 2.

Examples 56-63

Preparation of Polymer P9 (E117134-75)

E117134-75 Method

5% sucrose (VWR #BDH8029), glucose (Sigma G7528), and potassium phosphate buffer adjusted to pH 6.8-7.0 were combined in the amounts shown in Table 1. The pH was adjusted and the volume brought up to 3 liters with deionized water. The solution was then charged with 30 mL of the enzyme extract prepared supra and allowed to stand at ambient temperature for 72 hours. The resulting glucan solids were filtered, washed, and dried as in the preparation of Polymer P3. Yield was 28.2 grams of white flaky solids. The Mn and Mw were determined to be 66,657 and 144,421 Daltons respectively. The $^{13}$C NMR spectrum was consistent with dextran-free glucan polymer.

Preparation of Polymer P10 (E117134-75)

E117134-76 Method

5% sucrose (VWR #BDH8029), glucose (Sigma G7528), and potassium phosphate buffer adjusted to pH 6.8-7.0 were combined in the amounts shown in Table 1. The pH was adjusted and the volume brought up to 20 liters with deionized water. The solution was then charged with 30 mL of the enzyme extract prepared supra and allowed to stand at ambient temperature for 72 hours. The resulting glucan solids were filtered, washed, and dried as in the preparation of Polymer P3. Yield was 28.2 grams of white flaky solids. The $M_n$ and $M_w$ were determined to be 66,580 and 142,289 Daltons respectively. The $^{13}$C NMR spectrum was consistent with dextran free glucan polymer.

Spinning Solution S9 (117134-103)

The materials and procedures employed for the preparation of Spinning Solution S3 were replicated except that 25.0 g of Polymer P9 and 11.86 g of Polymer P10 were employed in place of 32 g of Polymer P2.

Fiber Spinning (117134-104)

Table 2 gives the spinning conditions that were used for the fibers prepared in Examples 56-63. In examples 59 and 61 the apparatus depicted in FIG. 1, as described supra, was employed as shown. In Examples 56-58, 60, 62, and 63, the apparatus of FIG. 1 was modified by removal of the driven roll, 10. Examples 56, 57, 59, 61, 62 and 63 were run through the draw bath, designated in FIG. 1 as bath 11. The liquid in the bath, the temperature thereof, and the path length through the bath are shown in Table 2. Fiber spinning was performed as described for Examples 49-55.

Examples 64-68

Preparation of Polymer P11 (E117134-105)

D102639-16 Method

5% sucrose, Dextran T-10, and $K_2PO_4$, adjusted to pH 7 using KOH, were combined in the amounts shown in Table 1. Boric acid was added to a concentration of 300 mM. The pH was adjusted using NaOH to pH 7.5 to dissolve boric acid; and, the volume was brought up to 20 liters using deionized water. The solution was then charged with 114 mL enzyme extract prepared as described supra and allowed to stand at 25° C. in an incubator for 48 hours. The resulting glucan solids were collected on a Buchner funnel using a 325 mesh screen over 40 micron filter paper in four separate parts. The filter cake was washed via displacement with 1.6 to 1.75 liters of deionized water and filtered 4 times as above. Finally two additional displacement washes with 1.6 to 1.75 liters of methanol were carried out, the filter cake was pressed out on the funnel and dried in vacuum at room temperature. Yield: was 241.8 grams of white flaky solids. The $M_n$ and $M_w$ were determined to be 93,420 and 211,926 Daltons respectively. The $^{13}$C NMR spectrum was consistent with dextran primed glucan polymer as described in Example 1.

Spinning Solution S10 (117134-105)

The materials and procedures employed for the preparation of Spinning Solution S3 were replicated except that 34.29 g of Polymer P11 were employed in place of 32 g of Polymer P2.

Fiber Spinning (117134-106)

Table 2 gives the spinning conditions that were used for the fibers prepared in Examples 64-68. The apparatus depicted in FIG. 1, as described supra, was modified by removal of the driven roll, 10. The fibers of Examples 65, 67, and 68 were passed through bath, 11 in FIG. 1, with the composition, temperature and path length shown in Table 2. The fiber spinning procedure was as described in Examples 49-55, under the conditions shown in Table 2.

Examples 69-73

Spinning Solution S11(117134-107)

The materials and procedures employed for the preparation of Spinning Solution S3 were replicated except that 29.3 g of Polymer P11 were employed in place of 32 g of Polymer P2.

Fiber Spinning (117134-108)

Table 1 gives the spinning conditions that were used for the fibers prepared in Examples 69-73. The apparatus depicted in FIG. 1, as described supra, was modified by removal of the driven roll 10. All fibers were quenched in a bath combining $H_2SO_4$, $Na_2SO_4$, and $ZnSO_4$. The quenched fibers were passed through bath 11 containing 5% aqueous $NaHCO_3$ Fiber spinning was performed as described for Examples 49-55.

Examples 74-85

Spinning Solution S12 (117134-133)

The materials and procedures employed for the preparation of Spinning Solution S3 were replicated except that 29 g of Polymer P11 were employed in place of 32 g of Polymer P2.

Fiber Spinning (D102684-051)

Table 2 gives the spinning conditions that were used for the fibers prepared in Examples 74-85 from spinning solution S12. The apparatus depicted in FIG. 1, as described supra, was modified by removal of the driven roll 10. All fibers were quenched in a bath combining $H_2SO_4$, $Na_2SO_4$, and $ZnSO_4$. The fibers of Examples 76-80 were also passed through the draw bath, 11, containing 5% aqueous $NaHCO_3$. Fiber spinning was performed as described for Examples 49-55.

Examples 86-101 and Comparative Examples A-G

Preparation of Polymer P12

D102639-1C Method

Sucrose, Dextran T-10, and $K_2PO_4$ were combined in the amounts shown in Table 1. The $K_2PO_4$ buffer was adjusted to pH 7.0 using KOH. The pH was further adjusted to pH 7.0 using NaOH. The volume was then brought up to 20 L using deionized water. The solution so prepared was then charged with 200 mL of enzyme extract, prepared supra. The thus prepared reaction medium was allowed to stand at 25° C. in an incubator for 48 hours. The resulting glucan solids were collected on a Buchner funnel using a 325 mesh screen over 40 micrometer filter paper in four separate aliquots. The filter cake was washed via displacement with 1.6 to 1.75 liters of deionized water and filtered 4 times as above. Two additional displacement washes with 1.6 to 1.75 liters of methanol were carried out. The filter cake was pressed out on the funnel and dried under vacuum at room temperature. Yield was 384.56 grams of white flaky solids.

Preparation of Polymer P13

D102639-008 Method

In a 150 gallon glass lined reactor with stirring and temperature control, to approximately 265 L of deionized water were added 75 kg of sucrose, 500 g of Dextran T-10, 50 L of undenatured ethanol, and 3.4 kg potassium phosphate buffer adjusted to pH 7.0 using KOH. The solution so formed was then charged with 2.5 L of the enzyme extract prepared supra, followed by an additional 1 L of de-ionized water and mixed at low shear at 25° C. for 72 hours. The resulting glucan solids was transferred to a Zwag filter with the mother liquor removed. The cake was washed via displacement with water 3 times with approximately 150 kg of water in each aliquot. Finally two additional displacement washes with 100 L of methanol were carried out. The material was dried under vacuum with a 60° C. jacket. Yield was: 6.6 kg white flaky solids.

Examples 86-97 and Comparative Examples A-D (CE A-D)

For each of Examples 86-97, a 20 ml glass vial was charged with the aqueous alkali metal hydroxide shown in Table 3. The concentration of the alkali metal hydroxide solution, in weight-%, and the actual amount of the alkali metal hydroxide solution are also shown in Table 3. Polymer P12 was then added to the vial in the amount shown in Table 3, representing the solids content of polymer in the resulting mixture. The vial was fitted with a septum through which a polypropylene stirring rod had been fitted. The contents were manually mixed with the plastic stirrer and placed in a heating block set to 20° C. for 24 hours with intermittent mixing. The polymer was completely dissolved. The solubility designations in Table 3 were determined by visual inspection. A clear solution was considered completely dissolved (CD); a clear solution with some small particles floating around was considered partially dissolved (PD); a turbid solution was considered undissolved (UD). It was considered that the partially dissolved solutions could be driven to complete dissolution with more intensive mixing.

TABLE 3

| | Ingredient | | | | | | |
|---|---|---|---|---|---|---|---|
| | NaOH | | KOH | | P12 | | |
| Example # | Conc (% by wt.). | Amount (g) | Conc. (% by wt.) | Amount (g) | Amount (g) | Solids (%) | Solubility |
| 86 | 5 | 9.51 | NA | NA | 0.5 | 5 | CD |
| 87 | 5 | 6.22 | NA | NA | 0.5 | 7.5 | CD |
| 88 | 4 | 4.53 | NA | NA | 0.52 | 10.4 | CD |
| 89 | 5 | 4.48 | NA | NA | 0.52 | 10.3 | CD |

TABLE 3-continued

| | Ingredient | | | | | | |
| --- | --- | --- | --- | --- | --- | --- | --- |
| | NaOH | | KOH | | P12 | | |
| Example # | Conc (% by wt.). | Amount (g) | Conc. (% by wt.) | Amount (g) | Amount (g) | Solids (%) | Solubility |
| 90 | 4 | 3.53 | NA | NA | 0.52 | 12.9 | CD |
| 91 | 5 | 3.51 | NA | NA | 0.52 | 12.8 | PD |
| 92 | 5 | 2.83 | NA | NA | 0.51 | 15.2 | PD |
| 93 | NA | NA | 7.5 | 4.48 | 0.50 | 10.1 | CD |
| 94 | NA | NA | 10 | 4.59 | 0.51 | 10.0 | CD |
| 95 | NA | NA | 7.6 | 3.56 | 0.50 | 12.3 | CD |
| 96 | NA | NA | 4 | 3.53 | 0.52 | 12.9 | CD |
| 97 | NA | NA | 10 | 3.50 | 0.50 | 12.6 | CD |
| CE A | 20 | 9.5 | NA | NA | 0.51 | 5.1 | UD |
| CE B | 12.5 | 3.50 | NA | NA | 0.52 | 12.9 | UD |
| CE C | 2.6 | 1.74 | NA | NA | 0.50 | 22.7 | UD |
| CE D | NA | NA | 2.5 | 4.50 | 0.50 | 10.0 | UD |

Examples 98-101 and Comparative Examples E-G (CE E-G)

Solutions were prepared as for Examples 86-97 except that the polymer employed was P13 instead of P12. Specific concentrations and results are shown in Table 4.

TABLE 4

| | Ingredient | | | | |
| --- | --- | --- | --- | --- | --- |
| | NaOH | | P13 | | |
| Example # | Conc (% by wt.). | Amount (g) | Amount (g) | Solids (%) | Solubility |
| 97 | 5 | 9.54 | 0.5 | 5.0 | PD |
| 98 | 2.5 | 6.17 | 0.5 | 7.5 | PD |
| 99 | 5 | 6.20 | 0.51 | 7.6 | PD |
| 99 | 4.9 | 4.49 | 0.53 | 10.5 | CD |
| 100 | 5 | 3.47 | 0.5 | 12.6 | CD |
| 101 | 5 | 2.82 | 0.52 | 15.6 | CD |
| CE E | 17.5 | 9.51 | 0.5 | 5 | UD |
| CE F | 12.4 | 3.54 | 0.52 | 12.8 | UD |
| CE G | 2.6 | 1.78 | 0.54 | 23.3 | UD |

The invention claimed is:

1. A solution comprising aqueous alkali metal hydroxide and poly($\alpha$(1→3) glucan) wherein the solids concentration of poly($\alpha$(1→3) glucan) is in the range of 5-20% by weight with respect to the total weight of the solution; and, wherein the concentration of the aqueous alkali metal hydroxide is in the range of 2 to 10%.

2. The solution of claim 1 wherein the alkali metal hydroxide is NaOH.

3. The solution of claim 2 wherein the concentration of the NaOH is 4 to 6%.

4. The solution of claim 1 wherein the solids concentration of the poly($\alpha$(1→3) glucan) is in the range of 7.5 to 16%.

5. The solution of claim 1 wherein the solution is isotropic.

6. The solution of claim 1 wherein the poly($\alpha$(1→3) glucan) is characterized by a number average molecular weight of at least 10,000 Daltons.

7. The solution of claim 3 wherein the solids concentration of the poly($\alpha$(1→3) glucan) is in the range of 7.5 to 16% and the poly($\alpha$(1→3) glucan) is characterized by a number average molecular weight of at least 10,000 Daltons.

8. The solution of claim 1 wherein the solution is anisotropic.

* * * * *